Jan. 14, 1941.  E. MARINO  2,228,576

SELF-ADJUSTING BRAKE

Filed June 8, 1939

INVENTOR
*Emilio Marino*
BY
ATTORNEY

Patented Jan. 14, 1941

2,228,576

UNITED STATES PATENT OFFICE 2,228,576

SELF-ADJUSTING BRAKE

Emilio Marino, Woodside, Long Island, N. Y.

Application June 8, 1939, Serial No. 277,986

4 Claims. (Cl. 188—79.5)

This invention relates to new and useful improvements in self-adjusting brakes.

More specifically the invention proposes the construction of self-adjusting mechanisms for brakes which is adapted to be used in combination with a brake drum, having brake shoes, and a means for moving the shoes into and out of contact with said drum.

Still further it is proposed that the self-adjusting mechanism operate in a manner to compensate for the wearing away of the brake band to cause the brake shoes to engage in the walls of the drum upon each application of the brake.

Still further it is proposed to characterize the self-adjusting mechanism by a tubular casing adapted to be mounted on a stationary cover of the brake mechanism between the brake shoes and which has a bolt slidably mounted therein one for each of the shoes.

Still further it is proposed to provide a means for connecting each of the bolts with its respective shoe in a manner to cause the bolt to be extended from the end of the casing when the shoe moves upon the application of the brake.

Still further it is proposed to provide each of the bolts with a plurality of cutouts extended inwards from one side thereof with the faces of the cutouts in step formation descending inwards of the bolts in a manner to retard the returning action of the brake shoes.

Still further it is proposed to provide a plunger for each of the bolts slidably mounted on the side of the casing and having their inner ends engaging a corresponding step of said step formation to permit the bolts to move freely outwards a certain amount after which a further movement of the bolt will cause the plunger to engage the next lower step in a manner to retard the inward movement of the bolt to compensate for the wearing away of the band.

Still further it is proposed to provide a mechanical means for lifting the plungers to disengage the lower ends thereof from the steps of the step formation to permit the bolts to move inwards with relation to the ends of the tubular casing.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
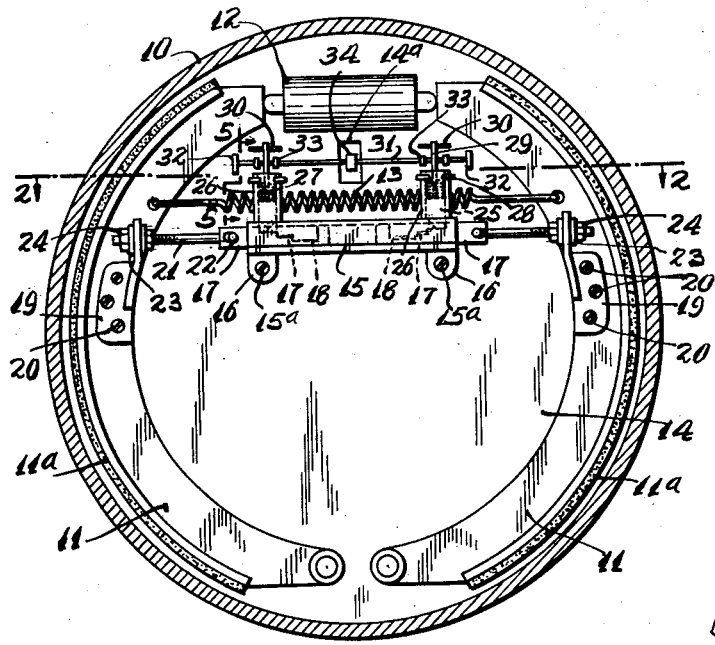
Fig. 1 is a vertical sectional view of a brake having a self-adjusting mechanism constructed according to this invention.
Figure 2:
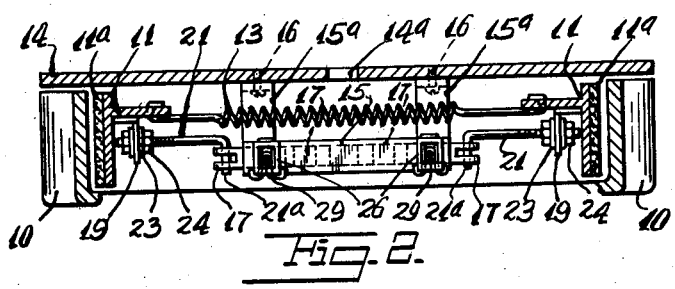
Fig. 2 is a horizontal sectional view on the line 2—2 of Fig. 1.
Figure 3:
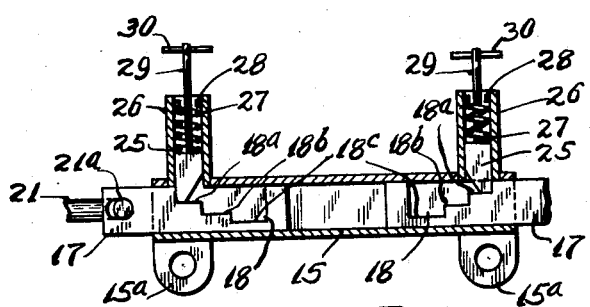
Fig. 3 is a vertical sectional view of the self-adjusting mechanism per se.
Figure 4:
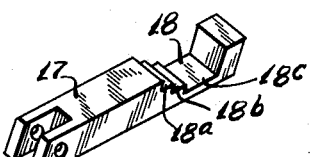
Fig. 4 is a perspective view of one of the bolts per se.
Figure 5:
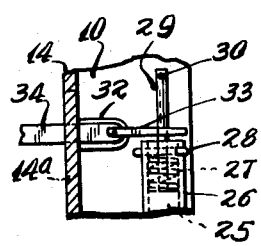
Fig. 5 is a vertical sectional view on the line 5—5 of Fig. 1.

The self-adjusting mechanism, according to this invention, is to be used in combination with the brake drum 10 having a pair of oppositely disposed brake shoes 11 pivotally mounted therein. A means 12 is provided for causing the brake shoes 11 to be moved into contact with the walls of the drum 10 for applying the brakes. A second means comprising a spring 13 is extended between the brake shoes 11 for returning them to their normal starting position when the action of the means 12 is released. Each of the brake shoes 11 has a brake band 11ª mounted thereon for engaging the walls of the drum 10 on each application of the braking mechanism. A stationary cover 14 is provided for closing one side of the brake drum 10.

The self-adjusting mechanism includes a tubular casing 15 fixedly mounted upon the inner face of the cover 14. The casing 15 is provided with a pair of rearwardly extended lugs 15ª normally positioned upon the cover 14. A screw 16 is passed through the lugs 15ª and into the cover 14 for fixedly maintaining the casing in position thereon. As shown in Fig. 1 the tubular casing 15 is positioned between the oppositely arranged brake shoes 11.

Bolts 17 are slidably mounted in the ends of the casing 15. Each of the bolts 17 is formed with a cutout 18 extended inwards from one side thereof. The base of the cutouts 18 of each of the bolts 17 is arranged in step formation consisting of a number of steps 18ª, 18ᵇ, 18ᶜ descending inwards thereof.

A means is provided for connecting the extended end of each of the bolts 17 with its respective brake shoe 11. This means comprises brackets 19 securely mounted upon the faces of the brake shoes 11. These brackets 19 are securely maintained in position by the means of a plurality of screws 20. Connecting rods 21 have one of their ends freely passing through upwardly extending portions of the brackets 19.

The other ends 21ª of the connecting rods 21 are bent at right angles to the body portion thereof and are turnably extended through openings 22 formed in the extended ends of the bolts 17. The openings 22 are slightly larger than the diameter of the material from which the connecting rods 21 are formed to provide a clearance between the adjacent faces of the bent ends 21ª of the rods 21 and the openings 22 to permit the brake shoes to move slightly relative to the bolts 17 when the bolts have stopped moving after the brakes have been released to always provide a tolerance between the shoe and the drum in the "off" position of the brakes so that the wheel may freely turn. A means is provided for adjustably attaching the connecting rods 21 to their respective brackets 19 in a manner to permit the brake shoes to assume a normal off position while the bolts are fully extended into the tubular casing 15. This means comprises a pair of washers 23 mounted upon each connecting rod 21 one on each side of its respective bracket 19.

Nuts 24 are threadedly engaged upon the connecting rods 21 and engage against the washers 23 for urging the same into contact with the bracket for fixedly mounting the connecting rods thereon. These nuts 24 may be unloosened for permitting the connecting rods to be shifted with relation to their brackets to control the amount its respective bolt will be extended from the end of the tubular casing 15 when the brake shoes 11 are in their normal off position.

Plungers 25 are slidably mounted on the sides of the casing 15 in a manner to have their inner ends engage corresponding steps of the step formation formed in the side of the bolts 17. These plungers 25 are slidably supported within upwardly extending housings 16 mounted on the casing 15. A means is provided for urging the bolts 25 into contact with the steps of the step formation of the bolts 17. This means comprises an expansion spring 27 mounted within each of the housings 26. A holding member 28 in the form of a piece of wire or other similar material is extended through the upper end of each of the housings 26 and has the upper end of the expansion spring 27 bearing thereagainst. The lower ends of the expansion springs 27 bear against the upper face of the brackets 25 for resiliently urging the same downwards.

Upon each successive application of the brakes the brake shoes 11 will be expanded by the means 12 causing the bolts 17 to move therewith with the plungers 25 sliding upon the step thereof. When the brakes are released the resiliency of spring 13 will return the bolts to their normal position within the casing 15.

However if the brake band 11ª becomes worn and it is desired to limit the return action of the brake shoes to compensate for this wearing the same is accomplished when the plunger moves through a greater distance with the width of one of its steps causing the plunger 25 to engage the next lower step. When the plunger engages the next lower step the step from which it rode now forms an abutment, for limiting the return action of the bolts 17.

A means is provided for raising the plunger 25 when the brake shoes 11 are to be provided with new brake bands 11ª replacing those which have become thin with wear. This means permits the bolts 17 to be engaged into the casing 15 causing the plungers 25 to engage the topmost step of the step formation to permit the brake bands 11ª to be out of contact with the walls of the drum to compensate for the thickness of the new band. This means comprises upwardly extending rods 29 which have their lower ends securely attached to the top face of the plunger 25. These rods 29 extend coaxially of the expansion springs 27 and are extended beyond the top ends of the casing 26. The extended ends of the rods 29 are provided with T-shaped cross heads 30. When the brake drum is taken apart for the application of the new brake bands 11ª the plungers 25 may be manually pulled outwards by grasping the T-shaped cross heads 30 and pulling the same upwards permitting the springs 13 to move the brake shoes 11 towards each other and also urge the bolt 17 into the casing 15.

The device is also provided with a manually operable mechanical means for raising the plungers 25 from the outside of the brake drums 10. This means comprises a shaft 31 which extends in back of the rods 29 and at right angles thereof. This shaft 31 is pivotally supported by means of a pair of brackets 32 mounted upon the casing cover 14 of the brake drum 10 above the casing 15. A pair of cams 33 for each of the rods 29 is mounted upon the shaft 31. The cams of each pair of cams 33 are so arranged that one of each pair engages on opposite sides of a respective rod 29. These cams are normally disposed beneath the T-shaped cross heads 30 of the rods 29. A means is provided for permitting the shaft 30 to be rotated from the outside of the drum without removing any of the parts thereof for lifting the plungers to permit the bolts 17 to be returned into the casing 15. This means comprises a handle 34 fixedly mounted upon the shaft 31 intermediate of its ends. This handle 34 extends through an opening 14ª formed in the cover 14.

The construction is such that when the extended end of the handle 34 is moved downwards the cams 33 will move upwards to engage the T-shaped cross heads 34 to move the plunger 25 upwards against the holding action of the expansion spring 27.

The operation of this device is as follows:

Upon each application of the brakes the means 12 which might be hydraulic or any other similar means causes the brake shoes 11 to be expanded to engage the brake bands 11ª with the drum 10 for the purpose of applying the brakes. This application of the brakes causes the bolts 17 to be extended with the plungers merely engaging the face of the respective step upon which it rests. However if the brake bands 11ª are slightly worn and it requires a greater movement of the shoes to fully apply the brakes the plungers 25 will ride off its respective step and engage the next lower step of the bolt 17. When the brakes are released the plungers 25 will engage against the step of which it rode permitting the same to act as an abutment to retard the return motion of the shoes. After an adjustment has taken place the clearance between the rods 21 and their respective openings 22 will permit the brake shoes to move sufficiently away from the drum to permit the wheel to freely turn. Thus a brake mechanism has been constructed which will compensate for the wearing away of the bands and permit the brakes to be fully applied upon each successive operation of the foot pedal of the brake mechanism.

It is to be understood that two independent cross heads 34 may be used for manipulating the plungers 25, selectively.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a self adjusting brake having a brake drum, brake shoes for the brake drum, means for moving said shoes into and out of contact with said drum, and a stationary cover for said brake drum, the combination of a tubular casing adapted to be mounted on said stationary cover between said brake shoes, bolts slidably mounted in the ends of said casing and having cutouts extend inwards from one side with the bases thereof in step formation descending inwards of the bolts, connecting rods between the extended ends of said bolts and said brake shoes, plungers slidably mounted on the sides of the said casing and having their inner ends engaging corresponding steps of said step formation, resilient means urging said plungers inwards, whereby after the bolts move outwards more than a certain amount, the plungers engage the next steps and prevent inward motion, and means for lifting said plungers outwards, said means for lifting said plungers outwards comprising rods extending therefrom, T-shaped cross heads mounted upon the upwardly extending ends of said rods, a pivotally mounted shaft extended at right angles to said rods, cams mounted on said shaft and engageable beneath said cross heads, and a handle fixedly mounted on said shaft and extended from within said drum and adapted to be manually urged downwards to correspondingly urge said cams upwards to move said plungers outwards.

2. In a self-adjusting brake having a brake drum, brake shoes for the drum, means for moving said shoes into and out of contact with said drum, a tubular casing mounted between said shoes, bolts slidably extended into the ends of said casing and having their extended ends connected with said shoes to move therewith, said bolts having cutouts extended inwards from one side with the bases thereof in step formation descending inwards, plungers slidably mounted on the sides of said casing and having their inner ends engaging corresponding steps of said step formation, resilient means urging said plungers inwards so that when said bolts move a distance greater than the width of one step said plungers will move inwards to engage the next adjacent steps and limit inward motion of the bolts, and a manual means operative from the outside of said drum for lifting said plungers outwards to free said bolts to move completely inwards.

3. In a self-adjusting brake having a brake drum, brake shoes for the drum, means for moving said shoes into and out of contact with said drum, a tubular casing mounted between said shoes, bolts slidably extended into the ends of said casing and having their extended ends connected with said shoes to move therewith, said bolts having cutouts extended inwards from one side with the bases thereof in step formation descending inwards, plungers slidably mounted on the sides of said casing and having their inner ends engaging corresponding steps of said step formation, resilient means urging said plungers inwards so that when said bolts move a distance greater than the width of one step said plungers will move inwards to engage the next adjacent steps and limit inward motion of the bolts, and a manual means operative from the outside of said drum for lifting said plungers outwards to free said bolts to move completely inwards, comprising T-shaped members extended upwards from said plungers, a turnable shaft extended parallel to the cross heads of said T-shaped members, cams fixedly mounted on said shaft and engaging beneath the cross heads of said T-shaped members, and means operative from outside of said drum for turning said shaft to simultaneously lift all of said plungers.

4. In a self-adjusting brake having a brake drum, brake shoes for the drum, means for moving said shoes into and out of contact with said drum, a tubular casing mounted between said shoes, bolts slidably extended into the ends of said casing and having their extended ends connected with said shoes to move therewith, said bolts having cutouts extended inwards from one side with the bases thereof in step formation descending inwards, plungers slidably mounted on the sides of said casing and having their inner ends engaging corresponding steps of said step formation, resilient means urging said plungers inwards so that when said bolts move a distance greater than the width of one step said plungers will move inwards to engage the next adjacent steps and limit inward motion of the bolts, and a manual means operative from the outside of said drum for lifting said plungers outwards to free said bolts to move completely inwards, comprising T-shaped members extended upwards from said plungers, a turnable shaft extended parallel to the cross heads of said T-shaped members, cams fixedly mounted on said shaft and engaging beneath the cross heads of said T-shaped members, and means operative from outside of said drum for turning said shaft to simultaneously lift all of said plungers, comprising a handle fixedly mounted on said shaft and extended from within said drum.

EMILIO MARINO.